US010006812B2

(12) United States Patent
Lane

(10) Patent No.: US 10,006,812 B2
(45) Date of Patent: Jun. 26, 2018

(54) TEMPERATURE TRACKING DEVICE AND METHOD USING SAME

(71) Applicant: T. Randall Lane, Lebanon, OH (US)

(72) Inventor: T. Randall Lane, Lebanon, OH (US)

( * ) Notice: Subject to any disclaimer, the term of this patent is extended or adjusted under 35 U.S.C. 154(b) by 355 days.

(21) Appl. No.: 14/821,702

(22) Filed: Aug. 8, 2015

(65) Prior Publication Data

US 2017/0038262 A1 Feb. 9, 2017

(51) Int. Cl.
- G05B 19/02 (2006.01)
- G01K 1/02 (2006.01)
- H04B 5/00 (2006.01)

(52) U.S. Cl.
CPC ........... *G01K 1/024* (2013.01); *H04B 5/0025* (2013.01); *H04B 5/0031* (2013.01); *H04B 5/0056* (2013.01)

(58) Field of Classification Search
CPC .... G01K 1/024; H04B 5/0031; H04B 5/0025; H04B 5/0056
See application file for complete search history.

(56) References Cited

U.S. PATENT DOCUMENTS

2005/0218233 A1* 10/2005 Petersen ............ G06K 19/0717
235/492

\* cited by examiner

*Primary Examiner* — Ryan Sherwin
(74) *Attorney, Agent, or Firm* — R. William Graham

(57) ABSTRACT

A device for monitoring conditions within an environment in which an item is disposed includes a environment monitoring tag operably disposed adjacent an article to sense environment surrounding said article and store environmental data sensed, wherein said tag is equipped with software and hardware to communicate said data using Near Field Communication protocol and a hand held communication device equipped with software and hardware to communicate using Near Field Communication protocol to receive environmental data sensed by said tag and analyze said data.

9 Claims, 9 Drawing Sheets

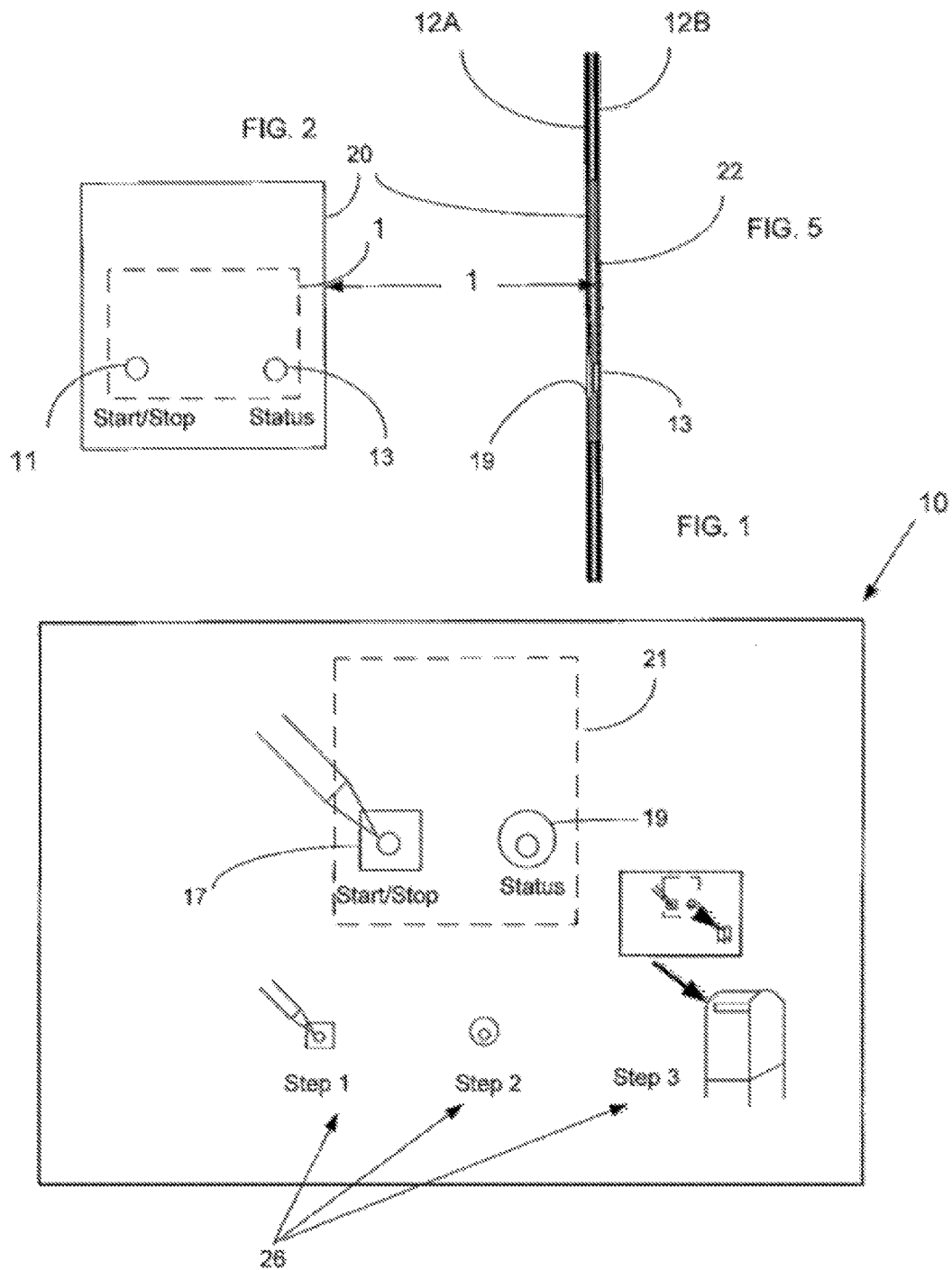

TEMPERATURE TRACKING DEVICE AND METHOD USING SAME

This application is a continuation of Ser. No. 13/239,431 filed Sep. 22, 2011 which is a continuation-in-part of Ser. No. 12/638,457 filed Dec. 15, 2009 and further claims the benefit of provisional application 61/434,389 filed Jan. 19, 2011.

FIELD OF INVENTION

The present device relates to single use or reusable environment monitoring tags. More particularly, but not by way of limitation, the invention relates to environment monitoring device disposed with and to sense the internal environment of an article contained in a package including but not limited to temperature, vibration, pressure, radiation, shock, light, position and atmosphere.

BACKGROUND OF THE INVENTION

Prior devices exist for monitoring conditions within an environment in which an article is contained. For example, such devices typically monitor, record and download the temperature history of package content in transit. Recorded data is currently downloaded with the aid of the party receiving the device shipped with the article. This creates a burden on the recipient and shipper to follow up on these tracking devices which in the case of pharmaceuticals, for example, have strict government regulations requiring temperature monitoring. Currently, computer based devices are required to be deployed at the recipient's location where the tags can be inserted into a reader and data transmitted to the shipper.

The current method and system for monitoring such conditions is lacking. For example, there is a need to know not only if the article was exposed to a critical temperature and when, but also what the article is and who's possession the article was in when such critical temperature was reached. There is a need to improve the system, device and method for monitoring conditions of an article contained in an environment.

SUMMARY OF THE INVENTION

It is an object to provide an improved device, system and method for monitoring conditions within an environment in which an article is disposed.

It is another object to provide system for tracking when the article was exposed to a critical temperature.

Accordingly, one aspect of the present invention is directed to a device for monitoring conditions within an environment surrounding an article. The device includes a single use or reusable environment monitoring tag disposed adjacent a product, package, article or container to sense environment surrounding the same including but not limited to temperature, vibration, pressure, radiation, shock, light, position and atmosphere.

The tag can preferably be equipped to receive environmental data sensed by the tag and analyze the data. In this regard, the tag can be equipped with Near Field Communication or NFC which is a short-range high frequency wireless communication chip which enables the exchange of data between devices over about a 10 centimeter (around 4 inches) distance. The device provides software and hardware to enable the transfer of such sensed environmental data through the NFC chip which enables an interface of a smartcard and a reader into a single device. By so providing, the recipient of the tag can communicate with existing ISO/IEC 14443 smartcards and readers, as well as with other NFC devices, and is well suited for usage with mobile phones and PDAs incorporating such similar technology which can be enabled through software of the instant invention to intelligently receive and constructively use such data.

The invention can also include an RFID receiver, for obtaining serial number, lot number and product ID of the articles disposed in a predetermined definable range. Thus, each article would be equipped with an RFID chip.

The invention also is directed to a system and method for monitoring conditions within an environment surrounding an article. The system includes a single use or reusable environment monitoring tag having hardware, including an NFC device, and software operably connected therewith and which can be disposed adjacent a product, package, article or container to sense the environment surrounding the same including but not limited to temperature, vibration, pressure, radiation, shock, light, position and a reader, a hand-held PDA or cell phone equipped with hardware for retrieving the environmental data sensed by the tag using a reader operably disposed on the PDA or cell phone equipped with NFC hardware and software to enable analyzing the data sensed by the tag.

The method includes the steps of providing a single use or reusable environment monitoring tag having hardware, including an NFC device, and software operably connected therewith and which can be disposed adjacent a product, package, article or container to sense the environment surrounding the same including but not limited to temperature, vibration, pressure, radiation, shock, light, position, disposing the tag adjacent a product, package, article or container in a manner to sense internal environment; providing the tag and product, package, article or container to a recipient; upon receipt, intelligently retrieving the environmental data sensed by the tag using a reader equipped with NFC hardware and software to enable analyzing the data sensed by the tag.

The present invention will be described in greater detail herein and with reference to the drawings.

BRIEF DESCRIPTION OF THE DRAWINGS

FIG. 1 depicts a schematic of the invention.
FIG. 2 shows in a tag used in the device of FIG. 1.
FIG. 5 is a sectional view through FIG. 1.

DETAILED DESCRIPTION OF THE PREFERRED EMBODIMENTS

Figure 3:
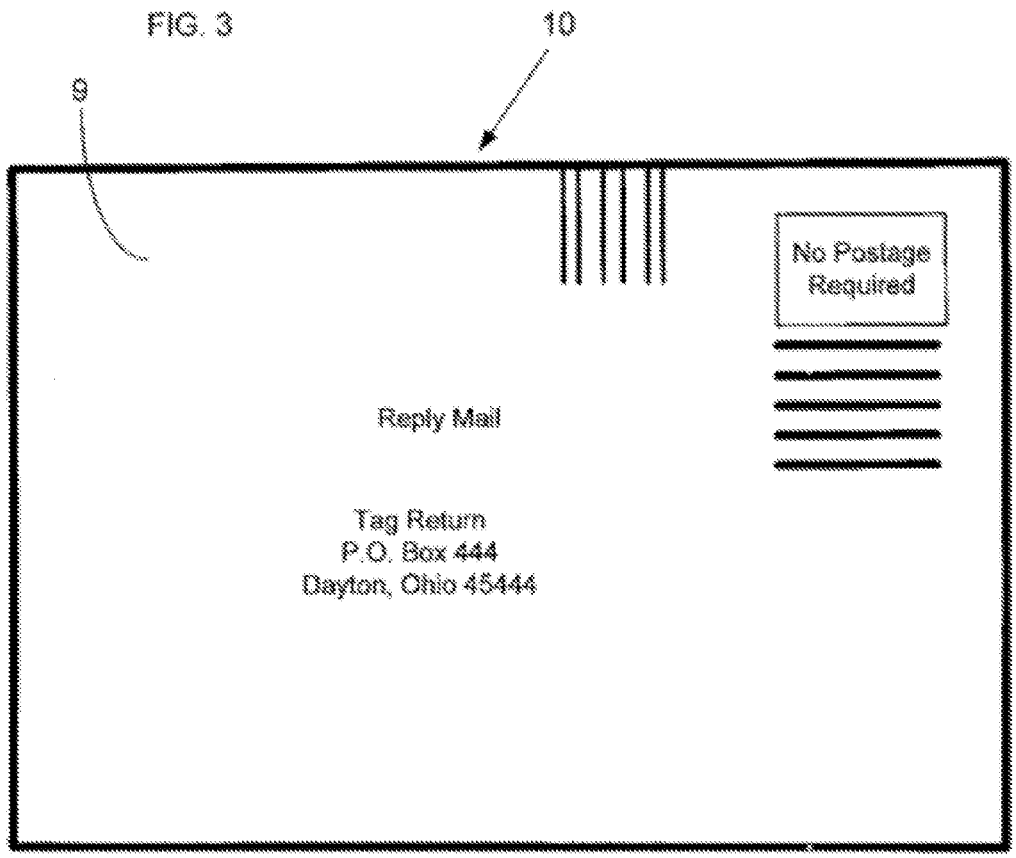
FIG. 3 depicts a back view of a device of the invention.
Figure 4:
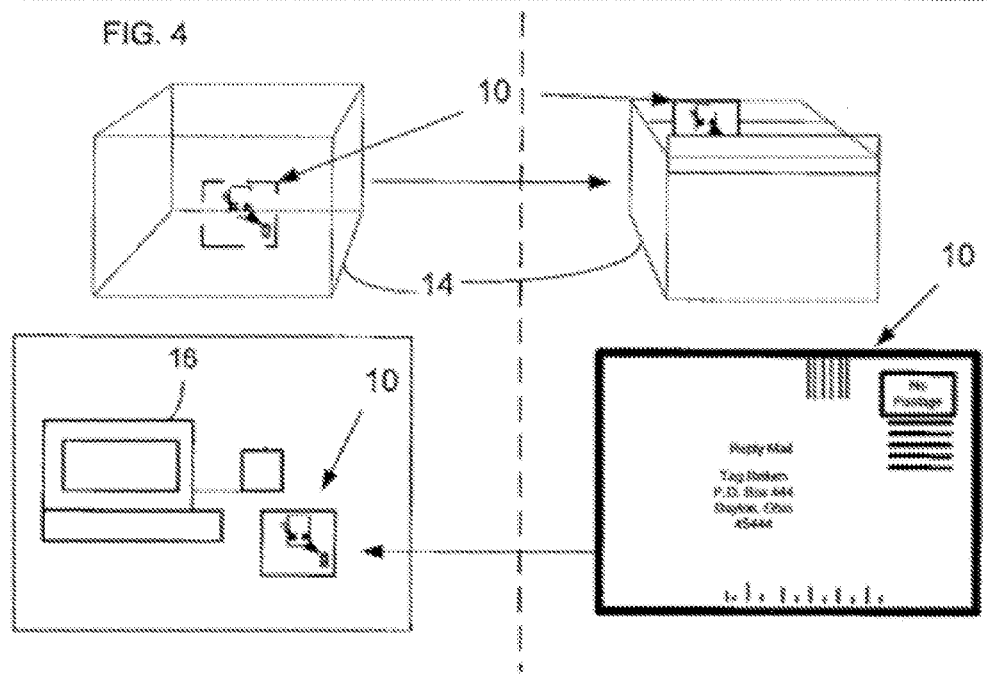
FIG. 4 depicts a system and method of the invention.
Figure 6:
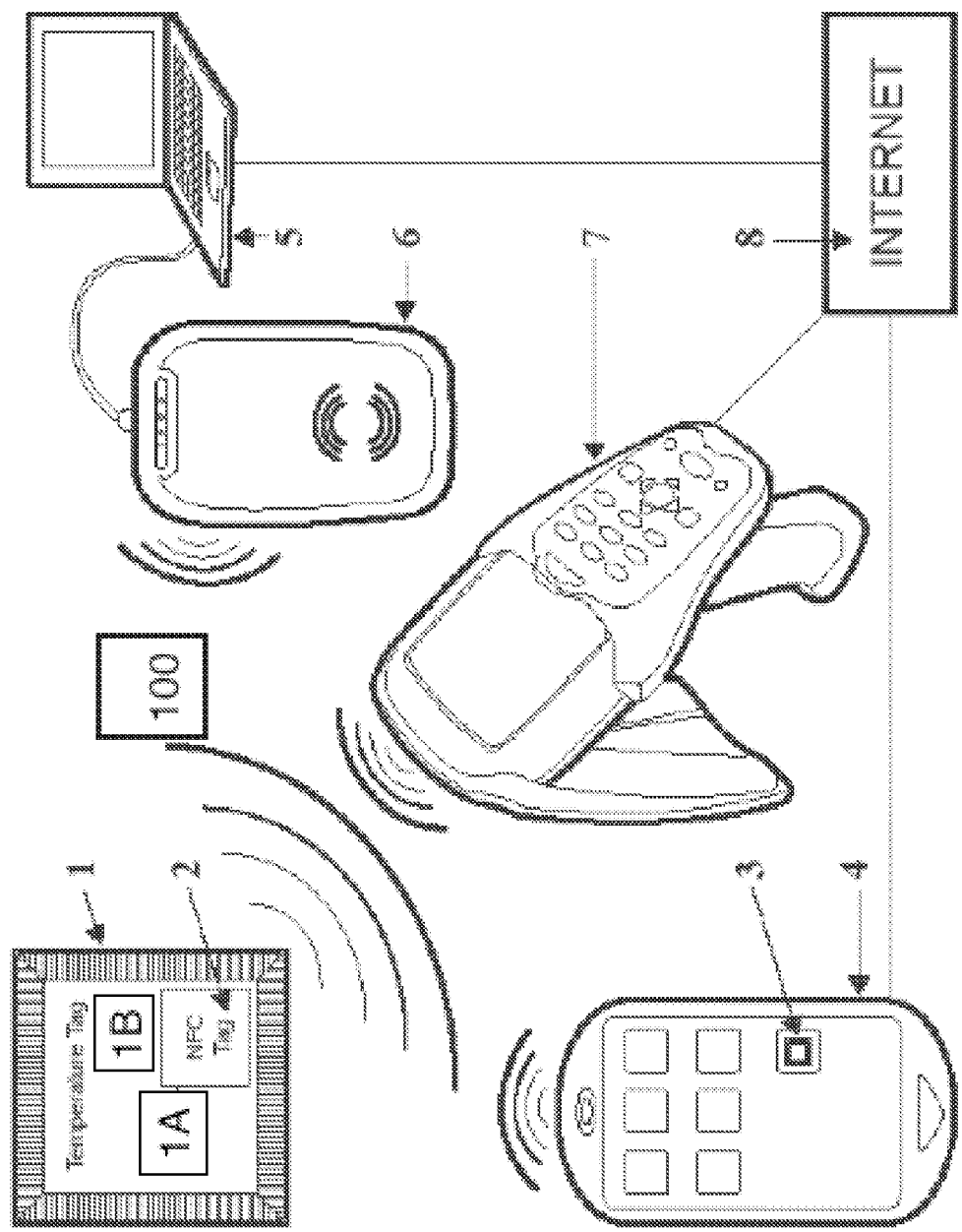
FIG. 6 depicts a schematic of an NFC device of the invention.

Referring to the drawings, there is provided a single use or reusable environment monitoring tag which is generally designated by the numeral 1. The tag 1 is equipped with hardware and software components 2 configured with Near Field Communication (NFC) protocol for enabling Near Field Communication over about a 10 centimeter (around 4 inches) distance as well as long range high frequency (HF). With NFC, a short-range high frequency wireless communication chip is included which enables the exchange of data between devices equipped with corresponding NFC hardware and software, such as a phone 4 equipped with complementary NFC chip 3 and software, computer 5 including or tethered with a NFC device 6, or scanner or NFC scanner 7. Such devices are preferably operably linked to Internet 8 to immediately transfer data to one or more party who can receive the data.

The invention can also include an RFID receiver 1A which can be operably connected to the tag 1, for obtaining serial number, lot number and product ID of article 100 disposed in a predetermined definable range. Thus, each article 100 would be equipped with an RFID chip. This will allow authentication of the individual articles 100 when packaged as well as cold chain authentication.

The device 1 includes software and hardware 1B to enable the obtaining and storage of environmentally sensed conditions as well as the transfer of sensed environmental data through the NFC components 2. Thus, there is provided an interface of a smartcard and a reader. By so providing, the recipient of the tag 1 can communicate with existing ISO/IEC 14443 smartcards and readers, as well as with other NFC devices 4, for example, to intelligently receive and constructively use such data.

Figure 8:
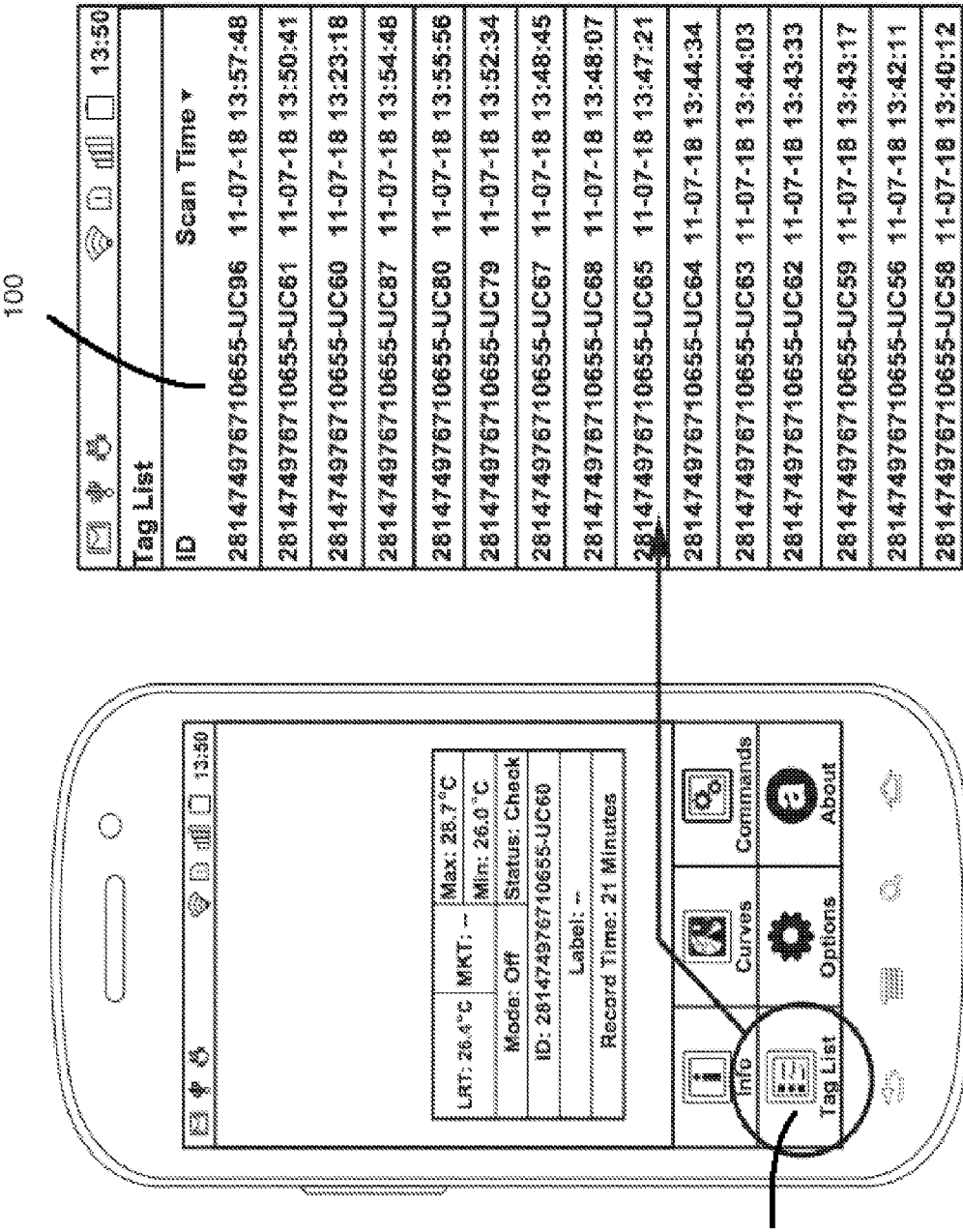
FIG. 8 shows a diagram of other application components of the invention.
Figure 9:
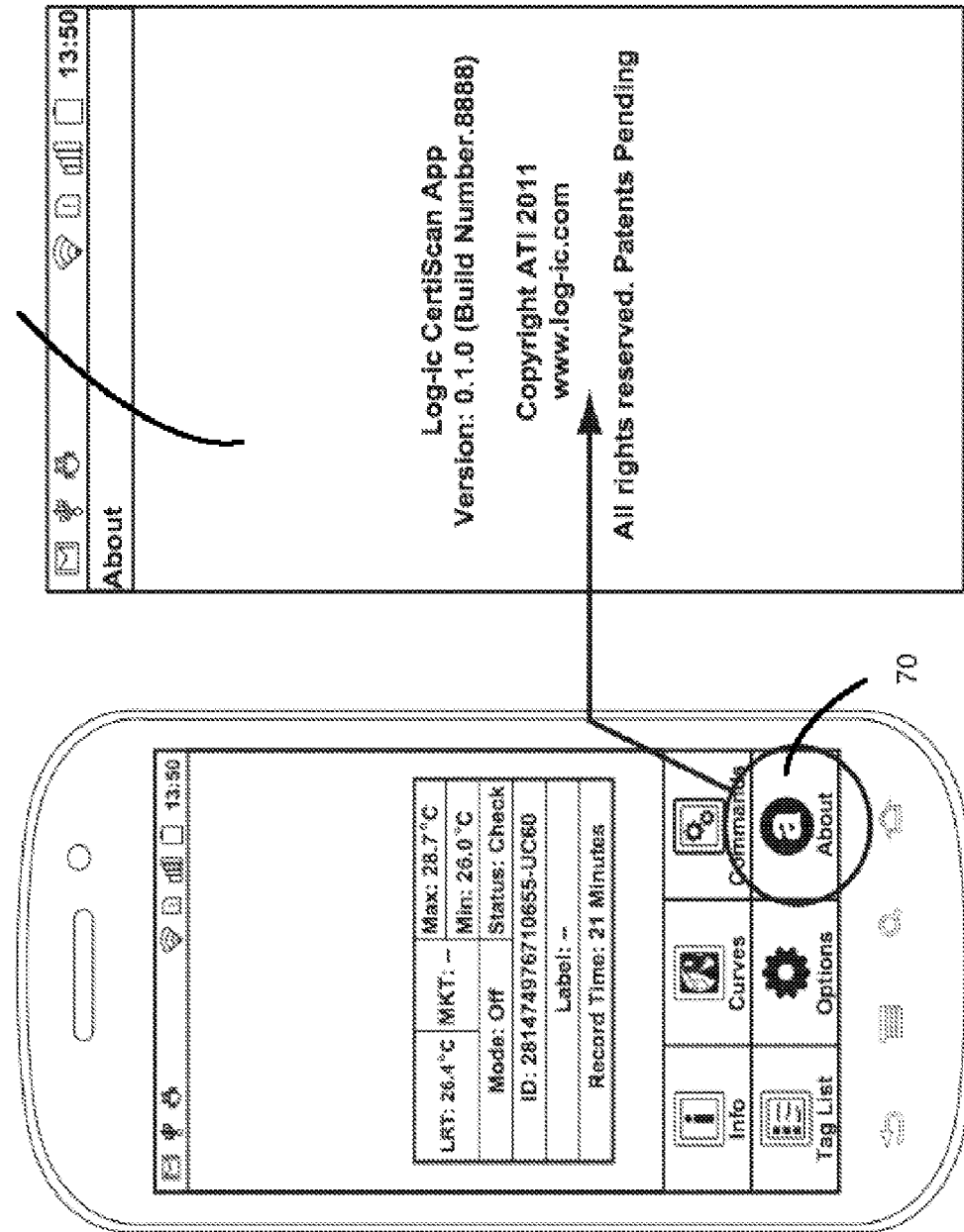
FIG. 9 shows a diagram of still other application components of the invention.
Figure 10:
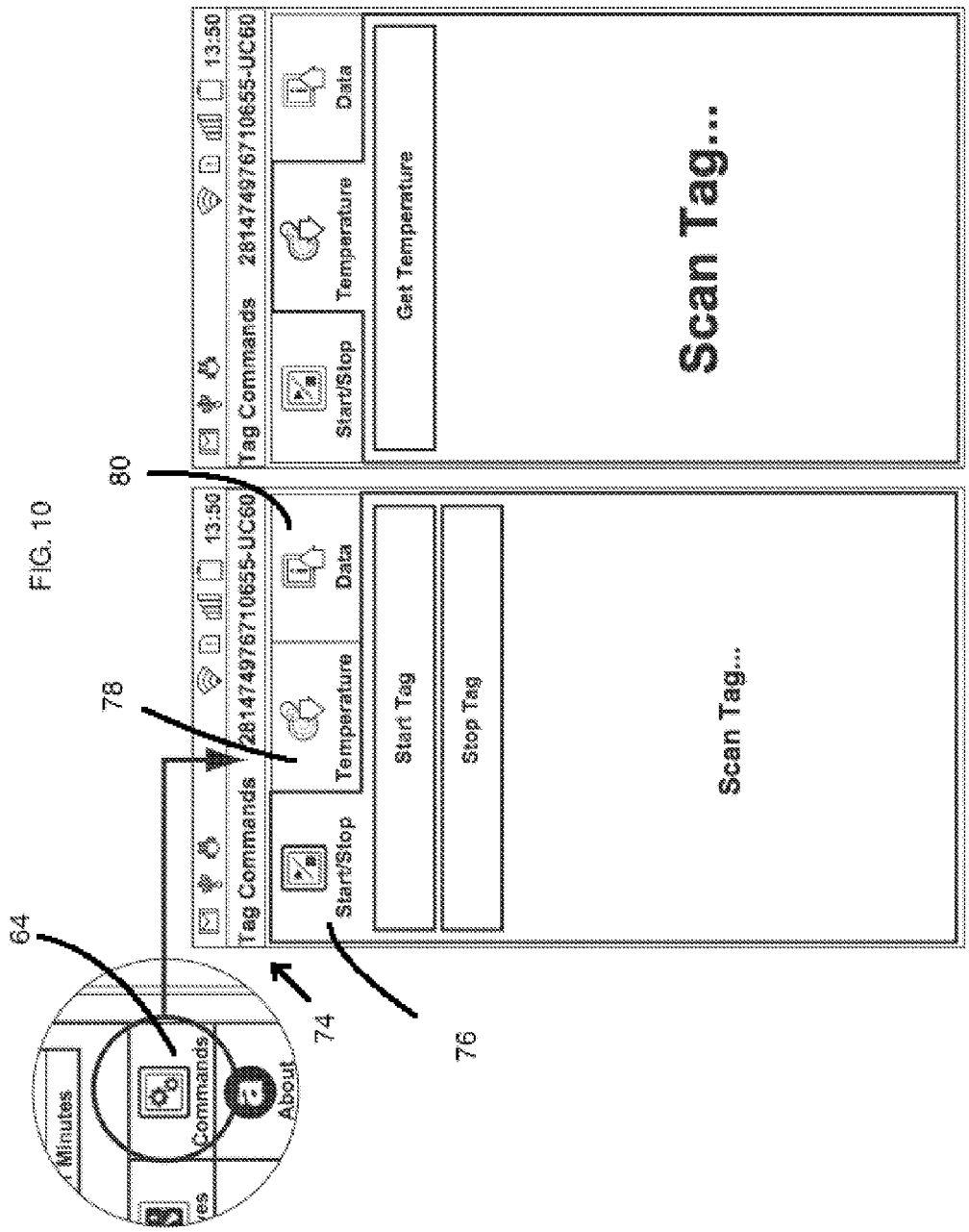
FIG. 10 shows a diagram of yet other application components of the invention.

In further describing the operational feature of the NFC devices 4, 6 and 7, FIG. 7-12 are referenced. The NFC devices 4 can be equipped with an application software interface (API) as seen in FIG. 7-12. The API shown can by way of example include an information icon (info 60), a graphic illustration icon (curves 62), a commands icon 64, a tag list icon 66, options icon 68 and about icon 70. There is provided a screen 72 which shows the most recent tag information for a particular tag 1. As seen in FIG. 10, by tapping the commands icon 64 a tag screen 74 can be brought up on the NFC device 4, which has start/stop icons 76 (for starting and stopping the tag 1 readings), temperature icon 78 (for communicating with tag 1 for obtaining temperature) and data icon 80 (for communicating with tag 1 for obtaining data therefrom).

Figure 11:
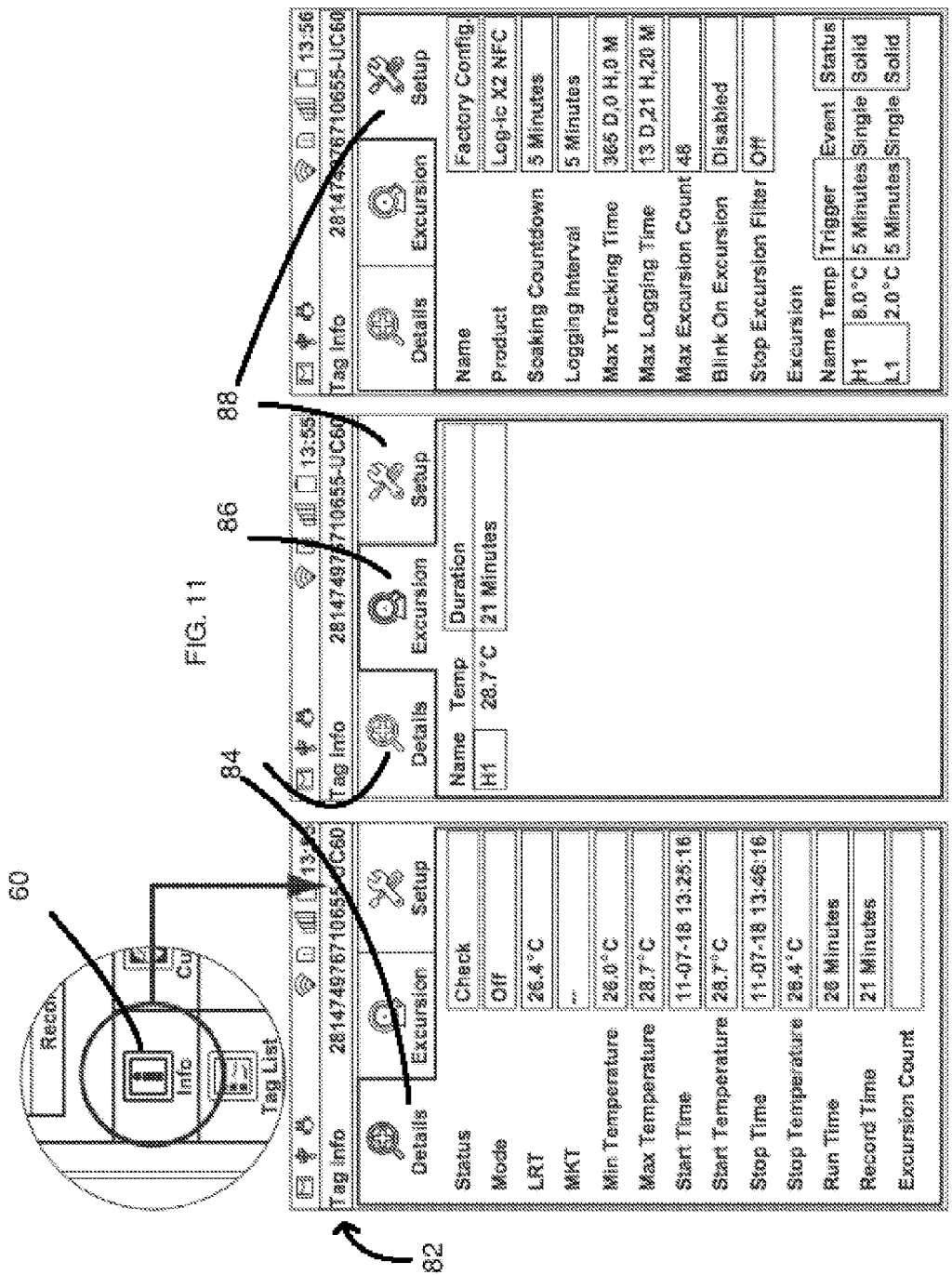
FIG. 11 shows a diagram of additional application components of the invention.

As seen in FIG. 11, by tapping the info icon 60, another tag screen 82 can be brought up on the NFC device 4, which has a details icon 84, an excursion icon 86 and setup button 88. The setup icon 88 which upon tapping initiates software associated with the NFC device 4 and tag 1 for identifying and configuring the tag 1, controlling soaking countdown time, logging interval time, maximum tracking time, maximum logging time, maximum excursion count, blink on excursion (which can be enabled or disabled for visual indicator, e.g., LED), stop excursion filter (on/off), and excursion fields of names (e.g., High (H1) Low (L1)), temperature—(e.g., 8.0° C., 2.0° C.), trigger time (e.g., 5 minutes high, 5 minutes low), status (e.g., solid-solid). The excursion icon 86 can bring up a tag screen which indicates the name (e.g., H1), temperature (e.g., 28.7° C.) and duration (e.g., 21 minutes). The details icon 84 brings up a status (e.g., check-ok), mode (on/off), LRT (last read temperature), MKT (mean kinetic temperature), minimum temperature set, maximum temperature set, start time, start temperature, stop time, stop temperature, run time, record time, excursion count time.

Figure 12:
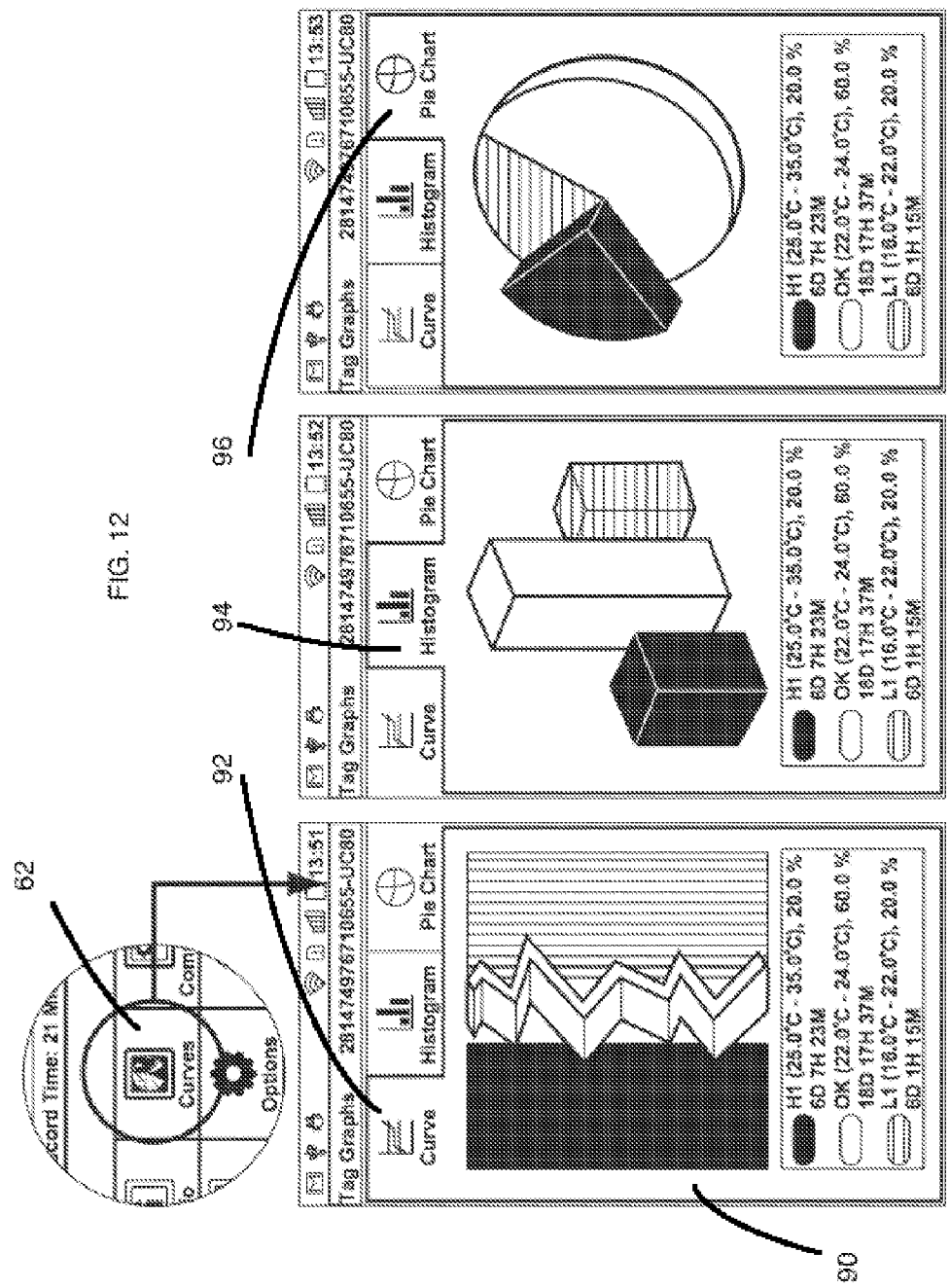
FIG. 12 shows a diagram of other application components of the invention.

As seen FIG. 12, by tapping the info icon 62, another tag screen 90 can be brought up on the NFC device 4 which has a curve icon 92, histogram icon 94 and a pie chart icon 96. These icons graphically represent data for tags 1 as to the critical environmental exposure.

Another feature illustrated in FIG. 8 is the tag list icon 66. Upon tapping the tag list icon 66, a tag screen 100 is brought up which shows all identification (IDs) for tags 1 and their scan date and time. The NFC device 4 can be programmed to store a predetermined number of prior tags 1, where upon reaching such number the oldest is deleted from storage record.

Figure 7:
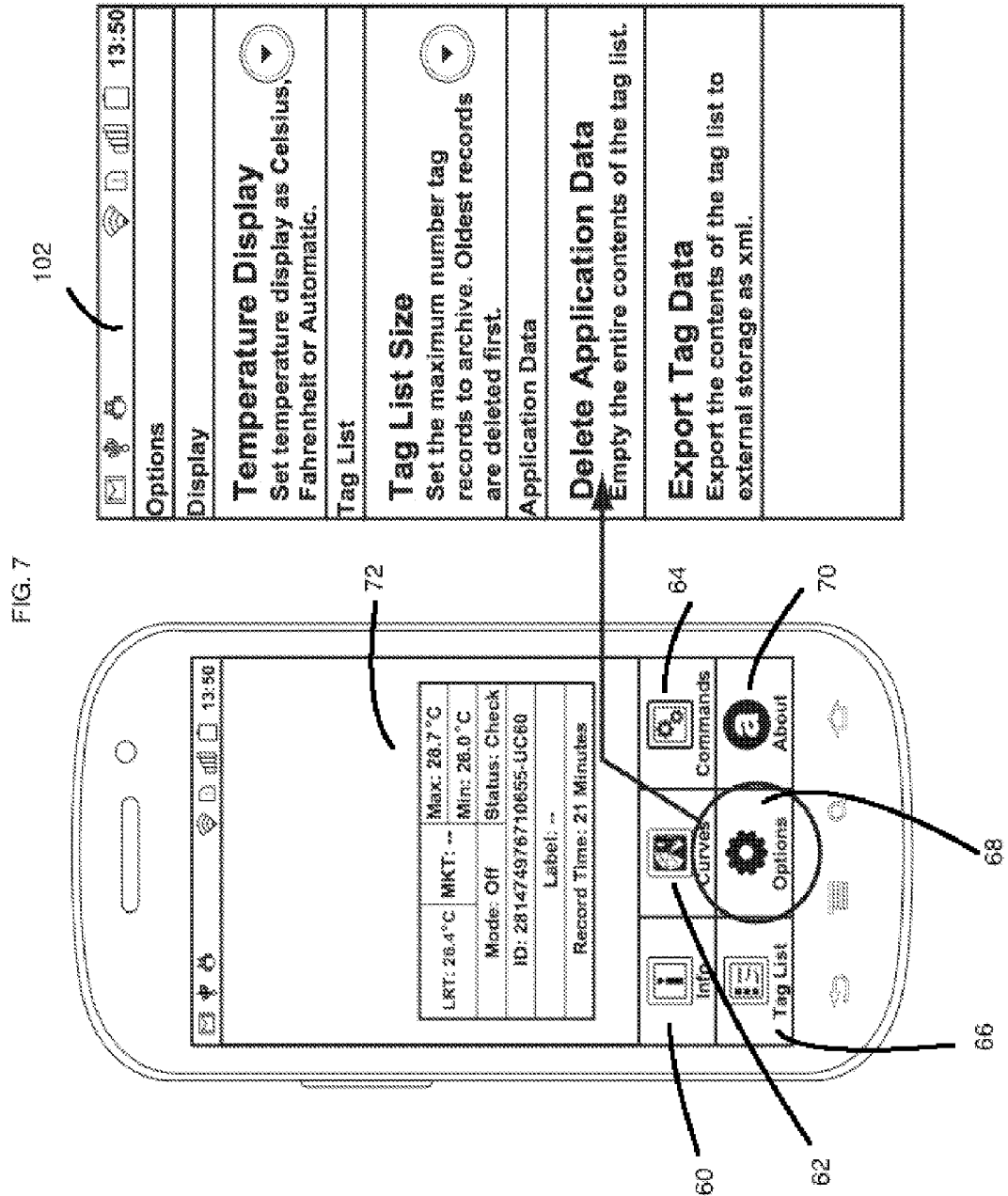
FIG. 7 shows a diagram of application components of the invention.

FIG. 7 depicts the options icon 68. Upon tapping the options icon 70, an options screen 102 is brought up which displays the temperature display (permits setting of temperature as Celsius, Fahrenheit or automatic), the tag list (permits setting the maximum number of tag records to archive, oldest deleted first), the delete application data (permits emptying entire content of tag list), and export tag data (permits exporting contents of the tag list to external storage format, e.g., as xml).

FIG. 9 depicts the about icon 70. Upon tapping the about icon 70, an about screen 102 is brought up which displays the NFC device 4, 6 or 7 information.

In one embodiment, a single use or reusable post card device 10 is provided wherein the tag 1 can be operably connected to a return postcard 9 which together form one form of tracking device 10. Preferably, the tag 1 can be operably disposed between a pair of substrates 12A and 12B which can be a paper substrate or other printable substrate. The post card device 10 can be disposed adjacent a product, package, article or container 14 to sense internal environment of the same including but not limited to temperature, vibration, pressure, radiation, shock, light, position.

An NFC reader device 16 of the type described can be provided to aid in receiving the data which is stored on the device 10 and permits the environmental data sensed by the tag 1 to be immediately to be analyzed. Further, the return postcard 9 enables reuse of the tag 1. Substrates 12A and 12B can preferably be such to permit printed indicia thereon and can also include a protective coating to aid in protecting the tag 1.

The environment monitoring tag 1 includes electronic components mounted on a substrate 11 which can preferably be covered by a layer of protective foam 20 over which is located an ESD layer 22 to reduce static buildup. The sandwich comprising tag 1, foam 20 and ESD layer 22 is inserted in between substrates 12A and 12B which can form an envelope.

The substrates 12A and 12B can include food or pharmaceutical grade heat sealable flexible plastic and be sealed together by heat and pressure applied to a perimeter of the sandwich sealing the elements into a waterproof unit. The proposed invention also permits the use of such postcard tag device 10 in food grade and pharmaceutical grade environments by enclosing the same in a continuous waterproof barrier of food grade plastic or other material separating the electronics and other components of the tag 1 from the environment. The barrier can be a separate or an integral part of the postcard. The tag 1 is of a size that allows for integration into a postcard 9 as seen in the drawings. Preferably, the postcard device 10 can be manufactured in a manner to provide for its reuse. In this regard, the device 10 can include a rechargeable or renewable source or a power source with a long life so that multiple uses can be made with a single device 10.

The device 10 can then be disposed in or about a package 14 which can contain food or medication, for example, without concern for contamination and can monitor the environment of the package 14. The tag 1 is formed with components known in art to perform monitoring of conditions of temperature, vibration, pressure, radiation, shock, light, position. The present invention contemplates providing tag 1 with a start/stop button 11 and status indicator 13 in predetermined fixed positions on tag 1. The start/stop button 11 starts and stops monitoring by the tag 1 and the status button 11 can be an LED which blinks to indicate operation, for example, a red light indicating the device has been stopped.

Postcard 9 is provided with cutout portions 17 and 19 as seen in FIG. 5. The tag 1 can be adhesively connected for example to a predetermined area 21 of an inside surface of substrates 12A and 12B as represented by dashed line. In this way, the start/stop button 11 and status indicator 13 can be positionably maintained within respective cutout portions 17 and 19 for aiding in carrying out the invention.

Return postcard 9 seen in FIG. 13 adheres to US mail standards wherein a U.S. postcard has a size within a maximum and a minimum size provided by the United States Postal Service and a maximum and minimum thickness provided by the United States Postal Service as set for below. The following table gives the specification in both inches and millimeters (cm dimensions can be calculated by dividing mm by 10).

| Size | Length × height (in) | Length × height (mm) | Thickness (in) | Thickness (mm) |
|---|---|---|---|---|
| maximum | 6 × 4.25 | 152.4 × 107.9 | 0.016 | 0.406 |
| minimum | 5 × 3.5 | 127.0 × 88.9 | 0.007 | 0.178 |

The thickness specification for the US postcard equates to a basis weight of 39 lb to 105 lb bond, 55 lb to 145 lb cover stock (card stock) or 145 gsm to 390 gsm.

When the environmental data are transmitted through any exemplary processor based NFC devices 16, 5, 4 or 7, it can effectively and immediately utilized in assessing the history of the environment within package 14. This reduces user error at the recipient end as well as risk of loss in the event the return of the tag 1 is not made.

The invention provides a system which includes a unique environment monitoring tag 1 which can be disposed adjacent a product, package, article or container 14 (and optionally operably connected to a return postcard) to sense internal environment of the same including but not limited to temperature, vibration, pressure, radiation, shock, light, position. NFC device 2 which upon receipt of the tag 1 is equipped to communicate environmental data sensed by the tag 1 to NFC device 4, 6, 7 which in turn can immediately transmit and optionally analyze the data using Near Field Communication protocol.

A method for monitoring conditions within an environment in which an article is disposed is provided. The method includes the steps of providing the single use or reusable environment monitoring tag 1 adjacent a product, package, article or container 14 to in a manner to actively sense internal environment of the same including but not limited to temperature, vibration, pressure, radiation, shock, light, position, internal environment. Upon receipt, the sensor of the tag 1 is turned off and the device 4, 6, 7 for example, intelligently retrieves the environmental data sensed by the tag 1 using a NFC device 4, 6, 7 equipped with NFC hardware and software to enable receiving and subsequent analyzing the data in a local or remote manner for purposes of determining compliance of a predetermined condition. The method can also include providing the tag 1 as part of a return postcard 9 and mailing the tag 1 and postcard 9 subsequent to receipt and data retrieval.

To aid in this regard the postcard 9 is preprinted with indicia 26 which can include steps of instructing the receiver to use a pen or pencil tip to press the stop button 11 (step 1), then check the status indicator 13 to if a red light is blinking (step 2) and finally placing the device 10 in a mailbox (step 3).

The above described embodiments are set forth by way of example and are not for the purpose of limiting the present invention. It will be readily apparent to those skilled in the art that obvious modifications, derivations and variations can be made to the embodiments without departing from the scope of the invention. Accordingly, the claims appended hereto should be read in their full scope including any such modifications, derivations and variations.

What is claimed is:

1. A system for monitoring conditions within an environment in which an item is disposed, which includes:
    an environment monitoring tag operably disposed adjacent an article to sense environment surrounding said article and store environmental data sensed thereon, wherein said tag is equipped with software and hardware to communicate said data using Near Field Communication protocol;
    a first hand held communication device equipped with software and hardware to communicate using Near Field Communication to control and set environmental data sensed by said tag, said software provided on said first Near Field Communication device configures a tag name associated with a product identification of said article in a predetermined definable range, wherein said first hand held communication device is equipped to identify and control operation of said tag wherein said software on said tag is further characterized to provide a tag name associated with a serial number for said tag, a lot number and a product identification of said article in a predetermined definable range, a soaking countdown time, logging interval time, maximum tracking time, maximum logging time, maximum excursion count, blink on excursion, minimum temperature set, maximum temperature set, start time, start temperature, stop time, stop temperature, run time, record temperature time, excursion count time and stop excursion filter; and
    a second hand held communication device equipped with software and hardware to communicate using Near Field Communication to receive environmental data sensed by said tag and analyze said data.

2. The system for monitoring of claim 1, wherein at least said second hand held device includes one of a smart reader, personal digital assistant or cell phone equipped with Near Field Communication hardware and software to enable retrieving and analyzing the data sensed by said tag.

3. The system for monitoring of claim 1, wherein said tag is equipped to monitor one of temperature, vibration, pressure, radiation, shock, light, position and atmosphere.

4. The system for monitoring of claim 1, wherein at least said second hand held communication device is equipped to generate a numerical and graphical report based on said environmental data.

5. The system for monitoring of claim 1, wherein at least said first hand held communication device is equipped to communicate and store data for a plurality of environment monitoring tags using Near Field Communication protocol.

6. The system for monitoring of claim 1, wherein said tag is operably disposed between opposing substrates which are sealably connected to form a postcard and includes an outer surface having preprinted return address indicia to enable said tag to be placed into the mail for purposes of the same to be returned for reuse.

7. The system for monitoring of claim 1, which includes a radio frequency identification chip receiver operably connected to said tag for obtaining one of a serial number, a lot number and a product identification of said article in a predetermined definable range, wherein said article is equipped with an radio frequency identification chip.

8. A method for monitoring conditions within an environment in which an item is disposed, which includes the steps of:
   (a) providing an environment monitoring tag adjacent the item in a manner to sense surrounding environment of the item wherein said tag is equipped with software and hardware to gather readings of one of temperature, vibration, pressure, radiation, shock, light, position and atmosphere of the surrounding environment and communicate said readings as a data signal using Near Field Communication protocol;
   (b) tapping a setup icon on said first Near Field Communication device which initiates software associated with said first Near Field Communication device and configures on said tag at least one of a tag name associated with a serial number for said tag, a lot number and a product identification of said article in a predetermined definable range, a soaking countdown time, logging interval time, maximum tracking time, maximum logging time, maximum excursion count, blink on excursion, minimum temperature set, maximum temperature set, start time, start temperature, stop time, stop temperature, run time, record temperature time, excursion count time and stop excursion filter;
   (c) tapping a start icon on a tag screen of a first Near Field Communication device for starting said tag readings;
   (d) transporting the tag and item to a recipient;
   (e) upon receipt of the tag and item, tapping a stop icon on a tag screen of a second Near Field Communication device for stopping said tag readings;
   (f) tapping on a temperature icon on said second Near Field Communication device for obtaining temperature from said tag; and
   (g) subsequent to said step of tapping on a temperature icon on said second Near Field Communication device reinitializing the tag and repeating steps (a)-(f).

9. The method for monitoring of claim 8, which includes tapping an excursion icon on said second Near Field Communication device initiating a screen which indicates said excursion temperature in one of a numerical and graphical format.

* * * * *